UNITED STATES PATENT OFFICE.

ALBERT VERLEY, OF COURBEVOIE, FRANCE, ASSIGNOR TO THE SOCIÉTÉ ANGLO FRANCAISE DES PARFUMS PERFECTIONNÉS, LIMITED, OF SAME PLACE AND LONDON, ENGLAND.

PROCESS OF MAKING OZONIZED TERPINOL.

SPECIFICATION forming part of Letters Patent No. 650,347, dated May 22, 1900.

Application filed July 31, 1899. Serial No. 725,678. (No specimens.)

*To all whom it may concern:*

Be it known that I, ALBERT VERLEY, electrician, a citizen of the Republic of France, and a resident of 7 Quai de Seine, Courbevoie, near Paris, France, have invented a certain new and useful Manufacture and Production of Certain Highly-Oxidized Organic Bodies, (for which I have applied for a patent in Great Britain, No. 27,523, dated December 30, 1898,) which invention is fully set forth in the following specification.

My invention has for its object the manufacture and production of certain highly-oxidized organic bodies by the action of ozone on organic bodies containing "double bonds," such as the alcohols, acetones, terpenic aldehydes, and the like. The active oxygen of the ozone becomes fixed. The resulting bodies are soluble in water. They are probably peroxids answering to the formula

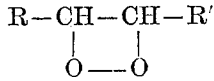

usually in combination with the elements of water. These bodies, which have important medicinal properties, are of a thick oily consistency, with a somewhat-bitter burning taste, and if suddenly heated decompose with an explosion. As an example I will take the body formed by the action of ozone on terpinol. One hundred grams of terpinol in five hundred grams of water are subjected to the action of a current of ozonized air for several hours. The temperature of the mass rises, and after a certain time the whole is changed into a clear liquid. A little carbonic acid is given off in the process. The ozonized terpinol, or what I term "ozo-terpinol," can be isolated in a pure state by extracting it from its solution by ether. The ether is carefully dried over chlorid of calcium and then evaporated off *in vacuo* in the cold. The substance (the ozo-terpinol) that remains is a viscous or thick oily substance which is easily decomposable at ordinary temperatures. Its analysis corresponds with the formula $C_{10}H_{18}O_3$, with more or less water in addition, terpinol having the formula $C_{10}H_{18}O$. A somewhat-similar body can be obtained in the same way from methyl heptenone and from citral. A striking characteristic of these bodies is that they give off their active oxygen again in the presence of even a trace of acetate of lead.

Having now particularly described and ascertained the nature of this invention and in what manner the same is to be performed, I declare that what I claim is—

1. The manufacture and production of a highly-oxidized organic body which consists in causing ozone to act upon terpinol and isolating the ozonized terpinol, substantially as described.

2. The manufacture and production of a highly-oxidized organic body which consists in causing ozone to act upon terpinol, and then isolating the ozonized terpinol with ether.

In testimony whereof I have signed this specification in the presence of two subscribing witnesses.

ALBERT VERLEY.

Witnesses:
EDWARD P. MACLEAN,
EDWIN MITCHELL.